Patented Nov. 24, 1953

2,660,534

UNITED STATES PATENT OFFICE 2,660,534

BLAST FURNACE OPERATION

Howard F. West, Joliet, and John H. Veale, Coal City, Ill., assignors to Illinois Clay Products Company, Joliet, Ill., a corporation of Illinois No Drawing. Application October 17, 1951, Serial No. 251,829

4 Claims. (Cl. 106—56)

This invention relates to improvements in the operation of blast furnaces obtained by improvement in blast furnace linings.

According to the invention, the blast furnace is lined with an unfired brick of true dimensions containing carbon and clay. A lining of this character makes possible substantial improvements and economies in blast furnace operation.

The further nature of the invention and the details thereof may be readily understood by reference to one illustrative blast furnace lining material and its method of preparation.

The refractory nature of carbon in a reducing atmosphere such as exists in a blast furnace has suggested the use of carbon or graphite linings for blast furnaces and such linings have been proposed. They comprise carbon or graphite bonded with pitch or the like and fired at very high temperatures. The pitch is of course destroyed, but a mechanical bond of coke remains. Carbon brick of this character are seriously damaged by the presence of water which may enter the blast furnace from a leak in the water jacket around the furnace above the tuyeres. At the high temperature existing in the furnace the carbon reduces the water (as in a water gas generator) with the loss of carbon from the liner. Water (in the form of steam) may also enter the furnace from the wet clay grog used to plug tap holes. Brick of this type are expensive, are not sufficiently true in dimensions to permit the same to be laid up in the furnace lining with minimum joints in the surface, and do not expand to close the joints. Gases and materials in fluid condition may enter such joints, with destructive results, as presently explained. To obtain brick of this character with true dimensions, to permit laying up with close joints, they must be trimmed by diamond saws, etc., a further substantial expense connected with the use of such brick.

Fire brick (made from fire clay) have also been employed as blast furnace liners. They have many advantages but are severely eroded by slag and the molten iron.

We have discovered that a carbon liner containing clay minerals (such as fire clay) not only possesses the advantages of the aforesaid pure carbon liner without its disadvantages, but possesses additional new and useful properties. The illustrative liner, as presently described, can be formed at low cost without firing, and with true and uniform dimensions, without subsequent sizing operations.

The illustrative liner advantageously facilitates the deposit of carbon, apparently in the form of graphite (referred to in the steel industry as "kish") on or in the surface of the liner brick. The kish not only coats and protects the liner, but gives it a smooth finish which acts as a lubricant between the liner and the charge, thereby reducing the very substantial erosion incident to charging great tonnages of ore, coke and flux (i. e., limestone and dolomite) into the blast furnace. Some of the silica in the clay content of the liner is reduced under the conditions existing in the furnace, to silicon which is picked up by the carbon-saturated molten iron in contact with the liner. The silicon entering the iron lessens its capacity to hold carbon, with the result that the iron (being saturated with carbon) throws out one or two percent of carbon which is deposited, apparently as graphite, on or in the surface of the liner. After the kish is thus deposited, no further action of this nature takes place. Also, the clay in the liner will fuse to coat or seal the carbon and thereby prevent its oxidation not only by air in the furnace but by the action of steam in the event water should enter the furnace as aforesaid. The liner thus incorporates the advantages of both a carbon and a fire clay liner.

In the pure carbon brick heretofore proposed, no silica is present to provide the silicon necessary for the deposit of kish, as aforesaid.

In the illustrative liner brick, the carbon may vary from 15 to 40%, the balance of the aggregate of the brick comprising clay minerals such as fire clay, including a substantial amount of silica naturally present in the clay. According to one method of bonding the liner, commercial concentrated sulphuric acid is added, as presently explained, to react with the clay to form a bond of acid aluminum sulphate. From 20 to 40% of the clay employed may be replaced by grog (ground burned fire clay). The amount of acid used varies with the amount of alumina and the fineness of the particles in the clay mineral, i. e., the aggregate surface area of the particles. About 2 to 9% of the amount of clay mineral of 66° Bé. (commercial concentrated) sulphuric acid is used. For a common type of fire clay (containing 40 to 50% kaolinite) about 3% of concentrated sulphuric acid is used.

The aggregates comprising the liner may also be bonded as disclosed in our co-pending application Serial 227,348. As therein disclosed, the bond-forming substances are sulphuric and phosphoric acids (preferably orthophosphoric acid) or one of the acids and the aluminum salt of the other acid. The clay employed is an imperfectly crystallized kaolinite, wherein sufficient alumina of the clay crystal is exposed for reaction with the phosphoric acid to form an aluminum phosphate bond, probably aluminum ortho-phosphate.

The aluminum phosphate bond thus formed, while itself being water-resistant, is not impervious to moisture, and therefore does not exclude water from the aggregates (particularly the clay) linked by it, leaving the clay particles exposed to the action of moisture, with the result that the strength of the bonded refractory would be greatly reduced after exposure to moisture. However, the clay particles may be protected against the weakening action of the moisture by aluminum sulphate formed either by reaction of sulphuric acid with the alumina of the clay mineral, or by the direct addition of aluminum sulphate in the presence of acid, as presently explained. However, aluminum sulphate is more costly than sulphuric acid, more difficult to distribute in the minor amounts used, over the clay, and more difficult to concentrate its waterproofing function on the clay particles. Therefore, sulphuric acid is preferred to aluminum sulphate. Acidic conditions are necessary to make the aluminum sulphate effective, and for that reason the waterproofing and supplementary bonding agent which is formed must be acid aluminum sulphate. The pH should not exceed about 3. Where sulphuric acid is used in the amount and concentration herein specified, sufficiently acid conditions exist to form acid aluminum sulphate. Where aluminum sulphate is used in place of sulphuric acid, the phosphoric acid creates the necessary acidic condition.

The aluminum sulphate resulting from the reaction of acid with the clay not only efficiently protects the clay aggregates from the action of water by forming on the surfaces of the clay particles, but acts as a supplemental bond to bond both the clay aggregates and the carbon and any other added inert aggregate. The aluminum phosphate is the primary moisture-resistant bond (though it is pervious to moisture) and the aluminum sulphate is impervious (to protect the clay against the action of moisture) and is a secondary bond.

An acid or soluble aluminum phosphate may be used in place of phosphoric acid to bond together the clay and other aggregates, provided it be used with sulphuric acid, and in the acid medium created by such acid. The sulphuric acid also functions as aforesaid to react with the clay to form the supplemental bond and the waterproofing agent to protect the clay particles from slaking and disintegration by moisture which would otherwise reach them through the moisture-pervious phosphate bond.

Silica may advantageously be added in place of some of the clay mineral to cause the refractory liner to expand slightly under heat. For example, about 10% free silica (in addition to the free silica in the clay) may be used. Generally the amount of silica added varies from 5 to 25%.

The sequence of adding the bond-forming constituents is not important provided such constituents are first added to and mixed with the inert and non-plastic aggregates. This facilitates distribution and avoids "balling up" of the clay, which would result if the clay were present on the initial mixing.

The amount of acids employed may be varied from 2½% to 7% of phosphoric acid (based on 100% strength) and 1 to 4% sulphuric acid (based on 100% strength). When aluminum sulphate is used in place of sulphuric acid, the amount employed may vary from 1 to 5%; and when aluminum phosphate is used in place of phosphoric acid, the amount may vary from 3% to 10%. Ortho-phosphoric acid is commercially available in three concentrations, namely 67%, 75% and 85%. Commercial sulphuric acid (e. g., 66° Bé. or 93 to 100% strength) is used. Such acid contains from 2 to 5% water. Phosphoric acid of 67% strength in the amount of 3.75% gives satisfactory results. Unless greater strengths are necessary, the amount of phosphoric acid is minimized to reduce cost.

The amount of acids used is preferably based on the total of the dry aggregates, since, even though the inert aggregates do not react with the acids, they hold some of the acid and make it unavailable for reaction. Furthermore, with a high proportion of inert aggregate, proper working consistency and adequate and proper distribution of the acid over the clay minerals, could not be attained if only the theoretical amount of acid (based on the clay mineral content alone) were used. Addition of water to secure proper working consistency would objectionably reduce the concentration of the acid, would cause migration of acid to and concentration in the surface, and would further increase the drying costs.

Preferably, the amount of clay in the aggregate should not be substantially less than 20% by weight of the total aggregate. The amount of bond-forming agent depends somewhat on the fineness of the aggregate. For example, in a product where the clay has the following screen analysis:

| | Per cent |
|---|---|
| Minus 4 plus 20 mesh | 50 |
| Minus 20 plus 65 mesh | 15 |
| Minus 65 mesh | 35 | only 3 to 4% sulphuric acid is required; and in the case where both sulphuric acid and phosphoric acid are used, 3.75 to 5% phosphoric acid of 67% concentration, and 1.5% commercial concentrated sulphuric acid are required. However, much more acid would be required if the clay were finer, e. g., 80% through 100 mesh.

The mixture is then preferably pressed under substantial pressures in the conventional brick press. After pressing, or other forming operation, heat must be applied to complete the reaction. While temperatures in excess of 212° F. will drive off all free water and develop the strength of the material, its maximum water resistance is not developed until the material is heated substantially above 212° F., e. g., to temperatures of the order of 400° F. Possibly such high temperatures drive off some of the water of combination, thereby developing increased water resistance. The maximum temperatures may exceed 400° F. but would increase cost. The liner thus prepared without firing has exceptionally true and square faces and corners and is uniform in size and shape. It may be laid up with minimum joint crevices.

The use of phosphoric acid or aluminum phosphate advantageously also gives the material the property of bloating under heat. Generally a linear expansion of 5 to 10% under heat is desired, to insure closing of any cracks between the brick. Silica also expands under heat, but its expansion is only approximately sufficient to compensate for the shrinkage of the clay in developing a ceramic bond in use.

Another problem encountered in blast furnace operations is destructive carbon deposition in the blast furnace lining. Carbon deposition occurs at about 800–900° F. in the presence of minute amounts of ferric oxide ($Fe_2O_3$) acting as a catalyst. Such ferric oxide occurs as inevitable impurities in brick comprising the lining of blast furnaces. In the ensuing reaction, two mols of CO (the reducing gas in the blast furnace) give up one mol of C (carbon) and leave one mol of $CO_2$. Such carbon is deposited inside the liner brick itself and eventually leads to its disruption. This is prevented in the illustrative liner by the sulphur contained in the bonding agents, the sulphur having the property of destroying the catalytic action of the ferric oxide. The bonding agent thus serves the additional function of preventing the aforesaid destructive carbon deposition.

Obviously, the invention is not limited to the details of the illustrative product and its method of manufacture, since these may be variously modified. Moreover, it is not indispensable that all features of the invention be used conjointly, since various features may be used to advantage in different combinations and sub-combinations.

Having described our invention, we claim:

1. The method of improving the operation of a blast furnace which comprises lining the furnace with molded refractory bricks comprising 15 to 40% carbon and the balance fire clay and silica, the aforesaid constituents being bonded together by one or more aluminum compounds selected from the group consisting of acid aluminum sulphate formed by the reaction of 2 to 9% of concentrated sulphuric acid with the clay and acid aluminum phosphate formed by the reaction of 2½ to 7% of phosphoric acid with the clay, a portion of the silica in said refractory being reduced to silicon by the carbon monoxide in the blast furnace, said silicon then entering the molten iron in the blast furnace to cause the iron to throw out a portion of its carbon and deposit the same on or in the surface of the refractory to lubricate the surface of the refractory and reduce erosion thereof in the operation of the blast furnace.

2. The method of improving the operation of a blast furnace which comprises lining the furnace with molded refractory bricks comprising 15 to 40% carbon and the balance fire clay and silica, the aforesaid constituents containing a minute amount of ferric oxide as a naturally occurring impurity and being bonded together by acid aluminum sulphate formed by the reaction of 2 to 9% of concentrated sulphuric acid with the clay, and destroying the tendency of the ferric oxide to act as a catalyst to cause destructive carbon deposition from the carbon monoxide by means of the sulphur in said acid aluminum sulphate.

3. A molded liner for blast furnaces comprising in combination 15 to 40% carbon granules and the balance fire clay and silica, the aforesaid constituents being bonded together by acid aluminum sulphate formed by the reaction of 2 to 9% of concentrated sulphuric acid with a portion of the alumina in the clay, said liner having graphite in or on its exposed surface formed by the action of silicon reduced from a portion of the silica in said liner by the reducing gas in said blast furnace.

4. A refractory brick comprising in combination 15 to 40% carbon granules and the balance fire clay and silica, the aforesaid constituents being bonded together by acid aluminum sulphate and aluminum phosphate formed by the reaction of 1 to 4% concentrated sulphuric acid and 2½ to 7% phosphoric acid.

HOWARD F. WEST.
JOHN H. VEALE.

References Cited in the file of this patent
UNITED STATES PATENTS

| Number | Name | Date |
|---|---|---|
| 196,061 | Wallace | Oct. 9, 1877 |
| 253,748 | Nehring | Feb. 14, 1882 |
| 261,430 | Clapp | July 18, 1882 |
| 354,126 | Godley | Dec. 14, 1886 |
| 1,339,266 | Linbarger | May 4, 1920 |